United States Patent
Onishi

(10) Patent No.: US 11,633,751 B2
(45) Date of Patent: Apr. 25, 2023

(54) RELEASE AGENT SPRAYING DEVICE AND FORMING APPARATUS

(71) Applicant: SUMITOMO HEAVY INDUSTRIES, LTD., Tokyo (JP)

(72) Inventor: Takeharu Onishi, Ehime (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 300 days.

(21) Appl. No.: 17/006,044

(22) Filed: Aug. 28, 2020

(65) Prior Publication Data

US 2021/0060596 A1 Mar. 4, 2021

(30) Foreign Application Priority Data

Aug. 30, 2019 (JP) .............................. JP2019-158279

(51) Int. Cl.
  *B05B 13/02* (2006.01)
  *B05B 12/00* (2018.01)
  *B21D 37/18* (2006.01)
  *B29C 33/58* (2006.01)

(52) U.S. Cl.
  CPC .......... *B05B 13/0278* (2013.01); *B05B 12/00* (2013.01); *B21D 37/18* (2013.01); *B29C 33/58* (2013.01)

(58) Field of Classification Search
  CPC ... B05B 13/0278; B05B 12/00; B05B 13/041; B21D 37/18; B21D 22/02; B29C 33/58; B21J 3/00; B21J 9/02; B21J 13/02
  See application file for complete search history.

(56) References Cited

U.S. PATENT DOCUMENTS 4,520,643 A * 6/1985 Werner ...................... B21J 3/00
                                                                  72/39
6,871,586 B2    3/2005 Teraoka

FOREIGN PATENT DOCUMENTS

| FR | 2531641 A1 * | 2/1984 |
| JP | 2845171 B2 | 1/1999 |
| JP | 4319631 B2 | 8/2009 |
| JP | 2013208714 A * | 10/2013 |

OTHER PUBLICATIONS

Office Action issued in German Application No. 10 2020 122 402.8, dated Dec. 2, 2021.

* cited by examiner

*Primary Examiner* — Alexander M Weddle

(74) *Attorney, Agent, or Firm* — Michael Best & Friedrich LLP

(57) ABSTRACT

A release agent spraying device that sprays a release agent to a die of a forming apparatus main body, the release agent spraying device includes a motor, a moving nozzle that advances and retreats in a direction intersecting a moving direction of the die and jets the release agent from a tip, and a connection mechanism that connects the motor to the moving nozzle and advances and retreats the moving nozzle by a rotation output of the motor in one direction.

4 Claims, 7 Drawing Sheets

STARTING POSITION

ADVANCEMENT END

RETREAT END

STOPPING POSITION (SPRAYING POSITION)

RELEASE AGENT SPRAYING DEVICE AND FORMING APPARATUS

RELATED APPLICATIONS

The content of Japanese Patent Application No. 2019-158279, on the basis of which priority benefits are claimed in an accompanying application data sheet, is in its entirety incorporated herein by reference.

BACKGROUND

Technical Field

Certain embodiments of the present invention relate to a release agent spraying device and a forming apparatus.

Description of Related Art

In a press apparatus which is an example of the forming apparatus, a moving nozzle, which advances and retreats in an interlocking manner with a slide having a die, sprays a release agent to the die. A drive mechanism of the moving nozzle is practically classified into a mechanical interlocking type and a servo motor drive type which is an example of a motor.

In the mechanical interlocking type, a slide and a moving nozzle are connected to each other by a link mechanism, and the up-and-down movement of the slide is mechanically converted into the advancement and retreat of the moving nozzle (for example, refer to the related art).

On the other hand, in the servomotor drive type, a moving nozzle is connected to a ball screw and a servo motor, which is a drive source thereof, and the driving of the servo motor is controlled such that the moving nozzle advances and retreats in synchronization with a slide (for example, refer to the related art).

SUMMARY

According to an aspect of the present invention, there is provided a release agent spraying device that sprays a release agent to a die of a forming apparatus main body and the release agent spraying device includes a motor, a moving nozzle that advances and retreats in a direction intersecting a moving direction of the die and jets the release agent from a tip, and a connection mechanism that connects the motor to the moving nozzle and advances and retreats the moving nozzle by a rotation output of the motor in one direction.

According to another aspect of the present invention, there is provided a forming apparatus including a forming apparatus main body including a die and a slide that is fixed to the die and advances and retreats in a moving direction of the die, a release agent spraying device including a motor, a moving nozzle that advances and retreats in a direction intersecting the moving direction of the die and jets a release agent from a tip to the die, and a connection mechanism that connects the motor to the moving nozzle and advances and retreats the moving nozzle by a rotation output of the motor in one direction, and a controller that controls an operation of the motor and jetting of the release agent from the moving nozzle.

The controller controls operations of the motor and the moving nozzle in synchronization with an operation of the slide.

DETAILED DESCRIPTION

In a mechanical interlocking type, since a slide and a moving nozzle are mechanically connected to each other, impact at the time of starting and stopping a press apparatus main body is directly transmitted to the moving nozzle and a link mechanism. For this reason, there is a possibility that a defect, such as backlash and damage occurs, in the moving nozzle or a movable portion of the link mechanism.

In this respect, in a servo motor drive type, the impact of a press apparatus main body is not transmitted to a drive mechanism of a moving nozzle. However, since the moving nozzle is moved by a ball screw, it is necessary to accelerate or decelerate the rotation of a servo motor to reverse the rotation when the moving nozzle is switched from retreat to advancement. Because of this, or a limit on the allowable number of rotations of the ball screw, it is difficult to operate the moving nozzle at a high speed.

It is desirable to operate a moving nozzle at a high speed while suppressing a defect caused by impact of a pressing operation.

Hereinafter, an embodiment of the present invention will be described in detail with reference to the drawings.

Apparatus Main Body of Press Apparatus

Figure 1:
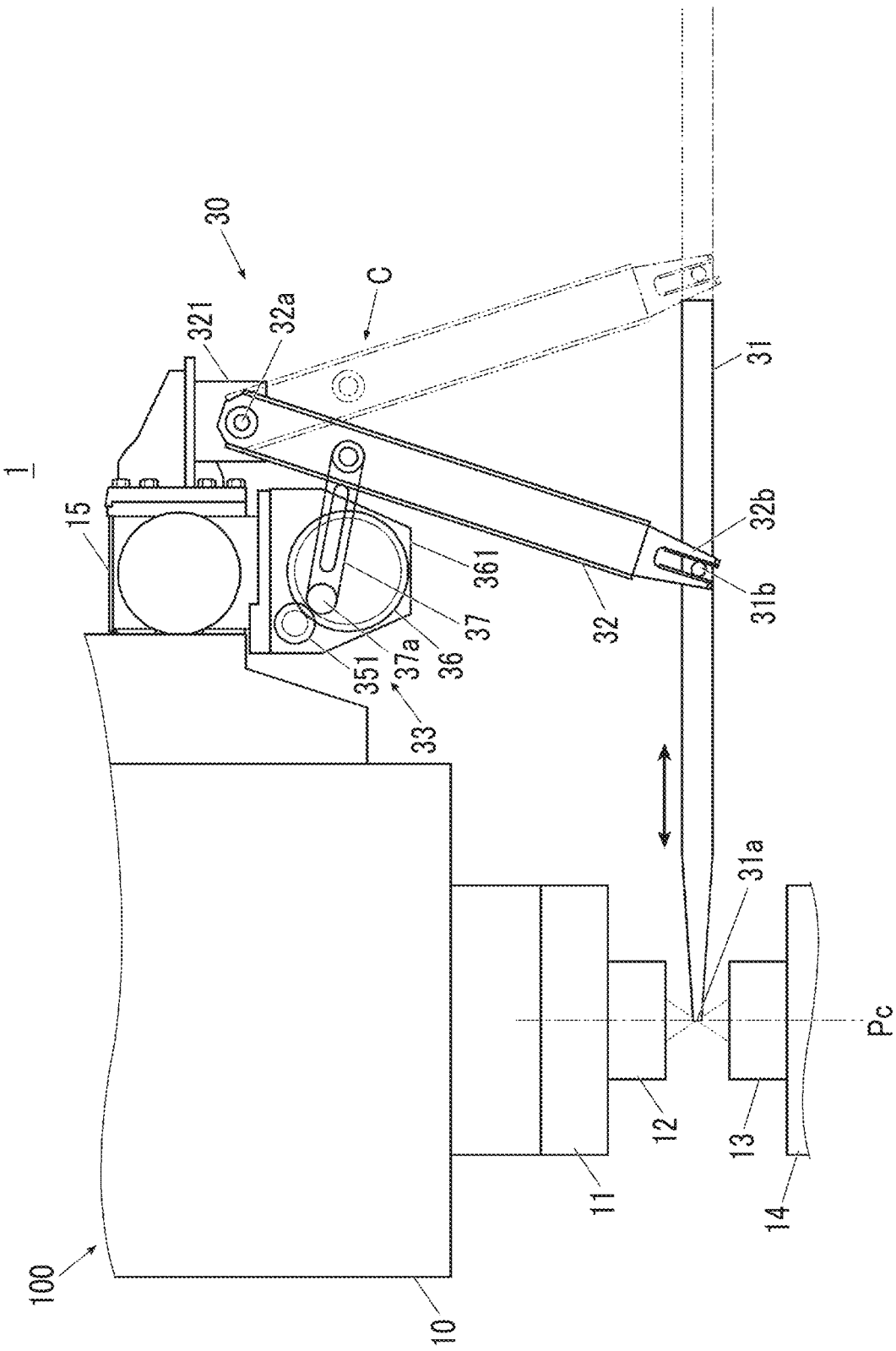
FIG. 1 is a view illustrating a press apparatus according to the embodiment.

FIG. 1 is a view illustrating a press apparatus 1 according to the embodiment.

As illustrated in the drawing, the press apparatus 1 according to the embodiment is a forging press apparatus that performs forging, and includes an apparatus main body 100. The apparatus main body 100 includes a slide 11, an upper die 12, and a lower die 13.

The upper die 12 is fixed to a lower part of the slide 11.

The lower die 13 is fixed on a bolster 14 and is disposed below the slide 11.

The slide 11 is supported by a guide (not illustrated) provided on a frame 10 so as to be able to advance and retreat in an up-and-down direction. The slide 11 is driven in the up-and-down direction by a drive unit 20 (refer to FIG. 3). As the slide 11 descends, the upper die 12 and the lower die 13 come close to each other, and a forming material is forged therebetween. Although a direction in which the slide 11 advances and retreats (pressing direction) is not particularly limited, description will be given assuming that the slide advances and retreats in the up-and-down direction in the embodiment. In addition, a configuration of the drive unit 20 that drives the slide 11 is not particularly limited, and may be a mechanical type, a hydraulic type, or a servo type.

Release Agent Spraying Device

The press apparatus 1 includes a release agent spraying device 30.

The release agent spraying device 30 sprays a release agent onto surfaces of the dies (the upper die 12 and the lower die 13) of the apparatus main body 100.

Specifically, the release agent spraying device 30 includes a moving nozzle 31, a lever 32, and a lever drive unit 33.

The moving nozzle 31 is a long tubular member, and atomizes a liquid release agent flowing therein from a tip 31a up and down. The moving nozzle 31 is disposed to extend along a direction substantially perpendicular to the up-and-down direction, and is supported by a slide guide (not illustrated) so as to be movable along an extending direction thereof. In addition, the moving nozzle 31 is connected to a jetting device 38 (refer to FIG. 3) that jets the release agent from the tip 31a.

Hereinafter, the extending direction (advancing and retreating direction) of the moving nozzle 31 that is substantially perpendicular to the up-and-down direction will be referred to as a "front-and-rear direction". In this direction, a direction in which the moving nozzle comes close to the apparatus main body 100 will be referred to as "front" and a direction in which the moving nozzle separates from the apparatus main body 100 will be referred to as "rear". In addition, the advancing and retreating direction of the moving nozzle 31 may be a direction intersecting the pressing direction of the apparatus main body 100.

An upper end of the lever 32 is attached to a support portion 321 so as to be pivotable by a pivoting shaft 32a. The support portion 321 is fixed to a drive shaft housing 15 attached to the frame 10. The drive shaft housing 15 houses a drive shaft (not illustrated) that advances and retreats the slide 11. On the other hand, an engaging portion 32b that is open in a U-shape toward the tip (lower end) is provided at a lower end of the lever 32. An engaging roller 31b provided at the moving nozzle 31 is engaged with the engaging portion 32b so as to be movable and rotatable in a longitudinal direction of the lever 32.

With such a configuration, the lever 32 advances and retreats the moving nozzle 31 in the front-and-rear direction with oscillation about the pivoting shaft 32a at the upper end.

Figure 2A:
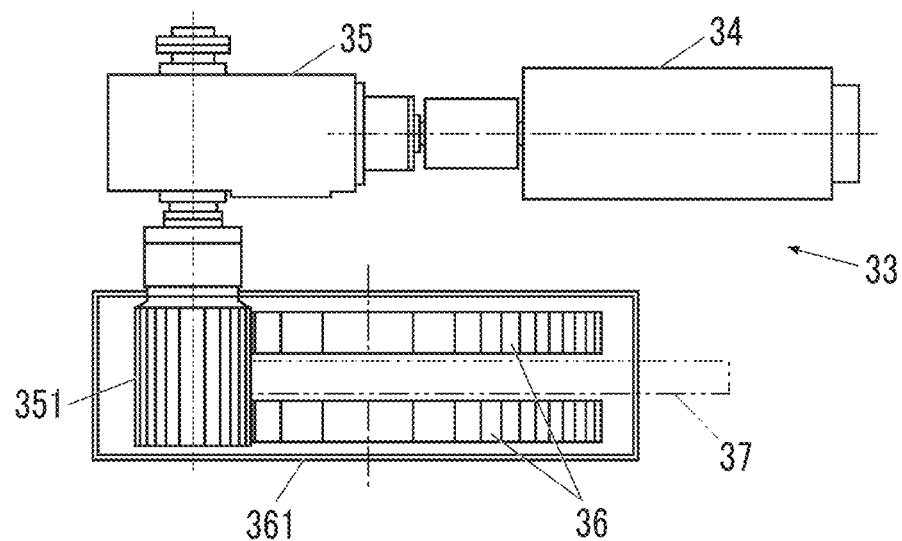
FIGS. 2A and 2B are a plan view and a side view illustrating a schematic configuration of a lever drive unit included in a release agent spraying device according to the embodiment, respectively.
Figure 2B:
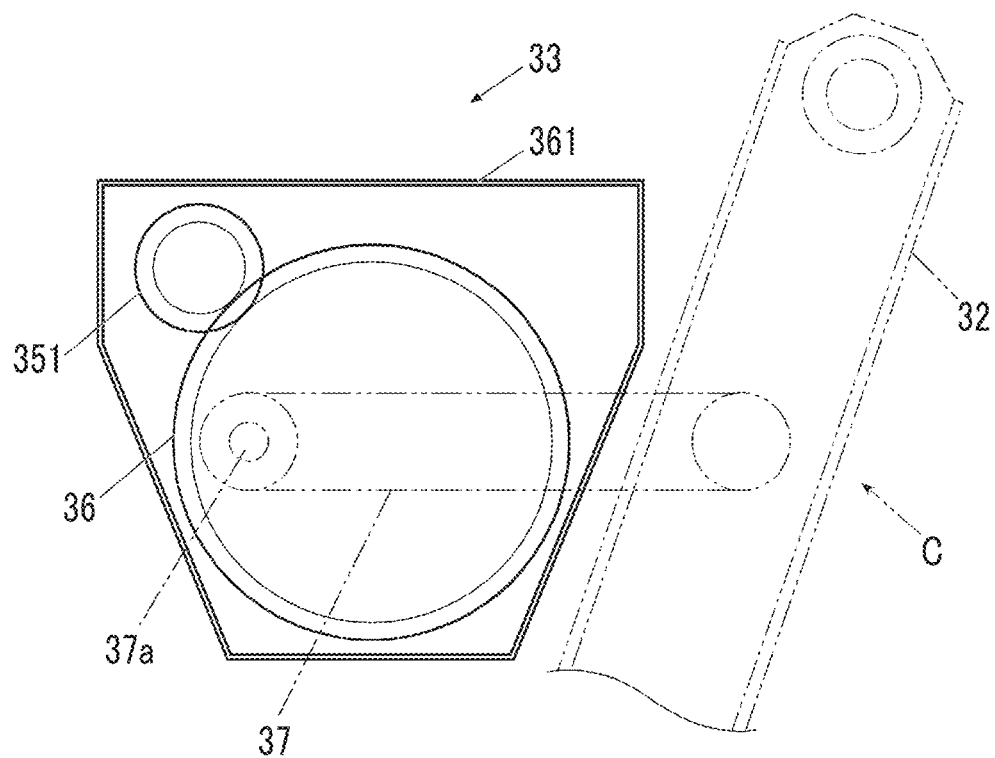

FIGS. 2A and 2B area plan view and a side view illustrating a schematic configuration of the lever drive unit 33, respectively.

As illustrated in the drawings, the lever drive unit 33 includes a servo motor 34, a speed reducer 35, and a gear 36. The servo motor 34 is an example of the motor according to the invention.

An output shaft of the servo motor 34 is connected to an input shaft of the speed reducer 35.

An output shaft of the speed reducer 35 is connected to a small gear 351.

The gear 36 is a spur gear that meshes with the small gear 351 and is housed in a gear housing 361 together with the small gear 351. The gear housing 361 is fixed to the drive shaft housing 15 (refer to FIG. 1). A connecting rod connecting portion 37a at one end portion of a connecting rod 37 is connected to an eccentric portion (a portion deviated from the center of rotation) of the gear 36. The other end portion of the connecting rod 37 is connected to an upper portion (a position at a predetermined distance from the upper end) of the lever 32. The gear 36, the connecting rod 37, and the lever 32 configure a crank mechanism C, and the servo motor 34, which is a drive source, and the moving nozzle 31 are connected to each other via the crank mechanism C.

With such a configuration, when the servomotor 34 of the lever drive unit 33 is driven, an output (rotation force) thereof rotates the gear 36 via the speed reducer 35 and the small gear 351. When the gear 36 rotates, the lever 32 oscillates within a predetermined oscillation range. With the oscillation of the lever 32, the moving nozzle 31 advances and retreats in the front-and-rear direction in a range from an advancement end to a retreat end, as will be described later.

The servomotor 34 and the moving nozzle 31 may be connected to each other via a link mechanism that advances and retreats the moving nozzle 31 by a rotation output of the servo motor 34 in one direction. Such a link mechanism is not limited to the crank mechanism C of the embodiment, and may be, for example, an eccentric gear mechanism. In addition, it is more preferable that the link mechanism is a toggle mechanism that can obtain a toggle effect just as the crank mechanism. C of the embodiment.

Control Configuration

Figure 3:
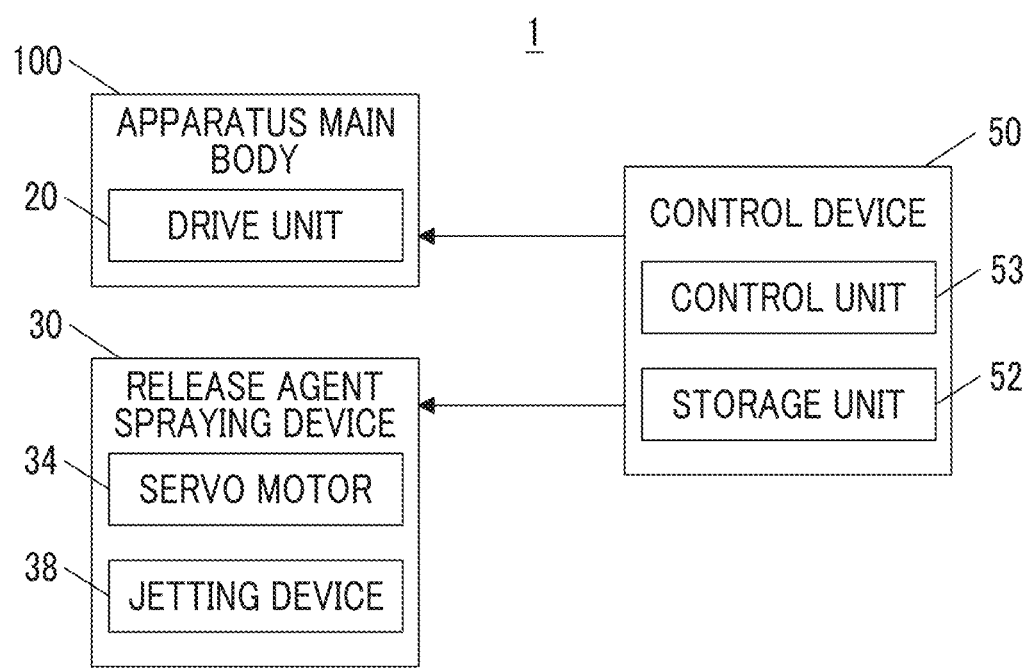
FIG. 3 is a block diagram showing a schematic control configuration of the press apparatus according to the embodiment.

FIG. 3 is a block diagram showing a schematic control configuration of the press apparatus 1.

As shown in the drawing, the press apparatus 1 includes a control device 50 that controls operations of the apparatus main body 100 and the release agent spraying device 30.

The control device 50 includes a storage unit 52 and a control unit 53.

The storage unit 52 is a memory, which stores programs and data for realizing various functions of the apparatus main body 100 and also functions as a work area.

The control unit 53 centrally controls each unit of the press apparatus 1. Specifically, the control unit 53 controls an operation of the drive unit 20 of the apparatus main body 100 to advance and retreat the slide 11 based on user operation or a predetermined program, controls an operation of the servo motor 34 of the release agent spraying device 30 to move the moving nozzle 31, and controls an operation of the jetting device 38 to jet a release agent from the tip 31a of the moving nozzle 31.

Spraying Operation of Release Agent

Next, a spraying operation of a release agent by the release agent spraying device 30 will be described.

Figure 4:
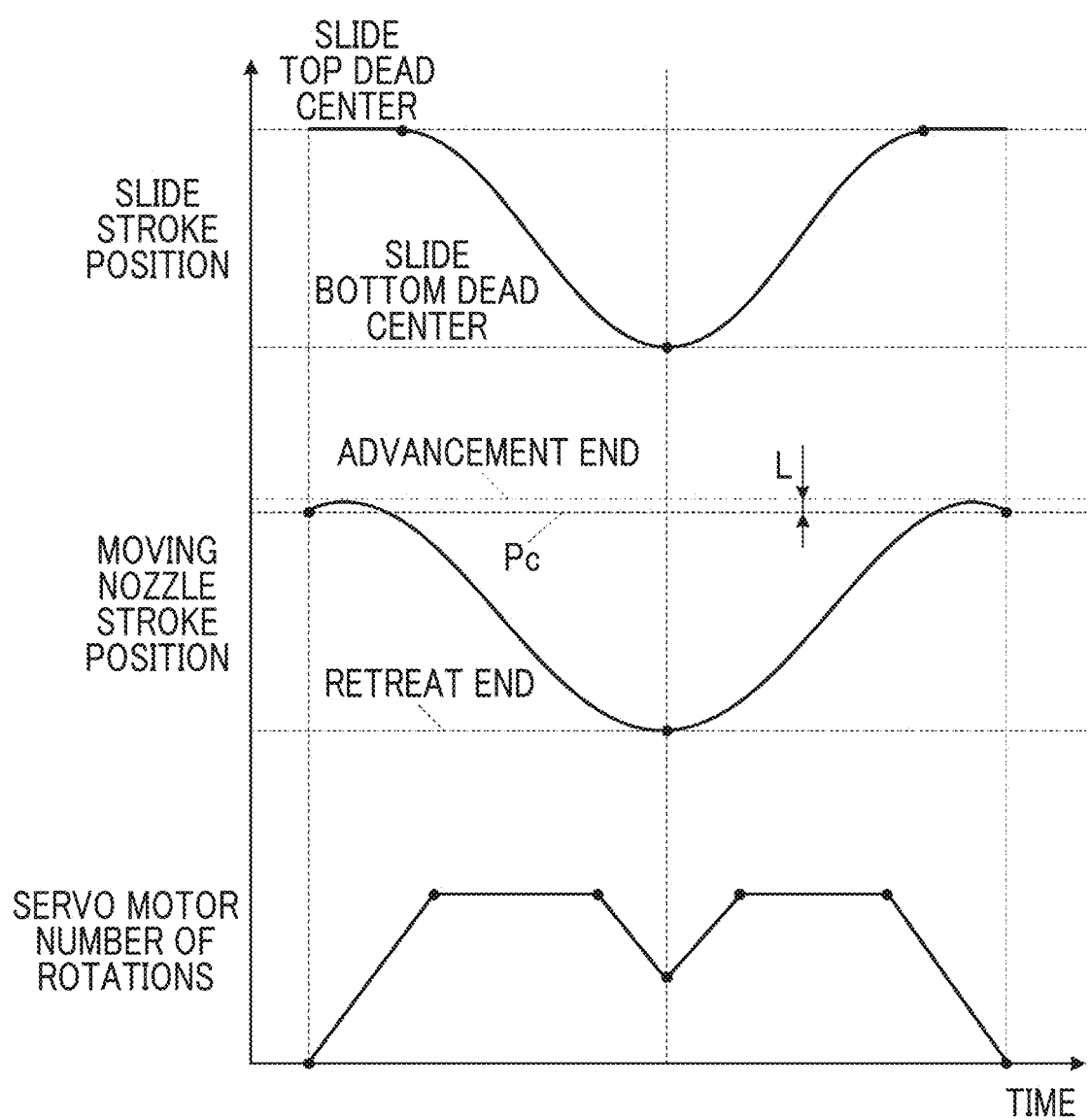
FIG. 4 is a time chart showing an example of respective stroke positions of a slide and a moving nozzle and the number of rotations of an output shaft of a servo motor.

FIG. 4 is a time chart showing an example of respective stroke positions (positions during stroke) of the slide 11 and the moving nozzle 31 and the number of rotations of the output shaft of the servo motor 34. FIG. 5A to FIG. 6B are views for describing movements of the moving nozzle 31 and the crank mechanism C. FIG. 7 is a graph for describing an oscillating operation of the moving nozzle 31 when spraying the release agent.

In the press apparatus 1 of the embodiment, the control unit 53 controls an operation of the moving nozzle 31 while interlocking (synchronizing) with advancing and retreating operations (slide motion) of the slide 11, for example, based on a predetermined program stored in the storage unit 52.

Figure 5A:
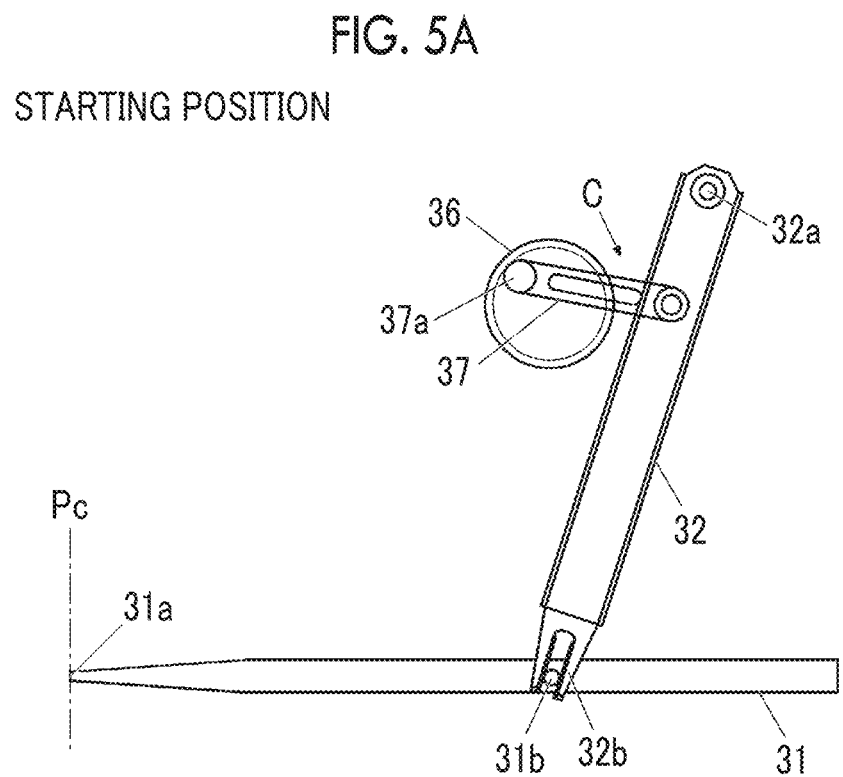
FIGS. 5A and 5B are views for describing movements of the moving nozzle and a crank mechanism.

First, at the time of start-up when the moving nozzle 31 starts a spraying operation, as shown in FIG. 5A, the moving nozzle 31 is in a state where the tip 31a is positioned at a press center Pc (FIG. 5A). The press center Pc is a center position for the dies (the upper die 12 and the lower die 13) in the advancing and retreating direction of the moving nozzle 31 (refer to FIG. 1).

In this case, in the crank mechanism C, the connecting rod connecting portion 37a is positioned in the vicinity of a top dead center (a position in a 9 o'clock direction in FIGS. 5A to 6B). The vicinity of the top dead center means that a rotation angle of the gear 36 is within a predetermined angle range (for example, within ±30 degrees) from the top dead center. In the embodiment, the connecting rod connecting portion 37a is positioned in a 10 o'clock direction in the drawing.

In addition, in this case, the slide 11 is still positioned at the top dead center.

Figure 5B:
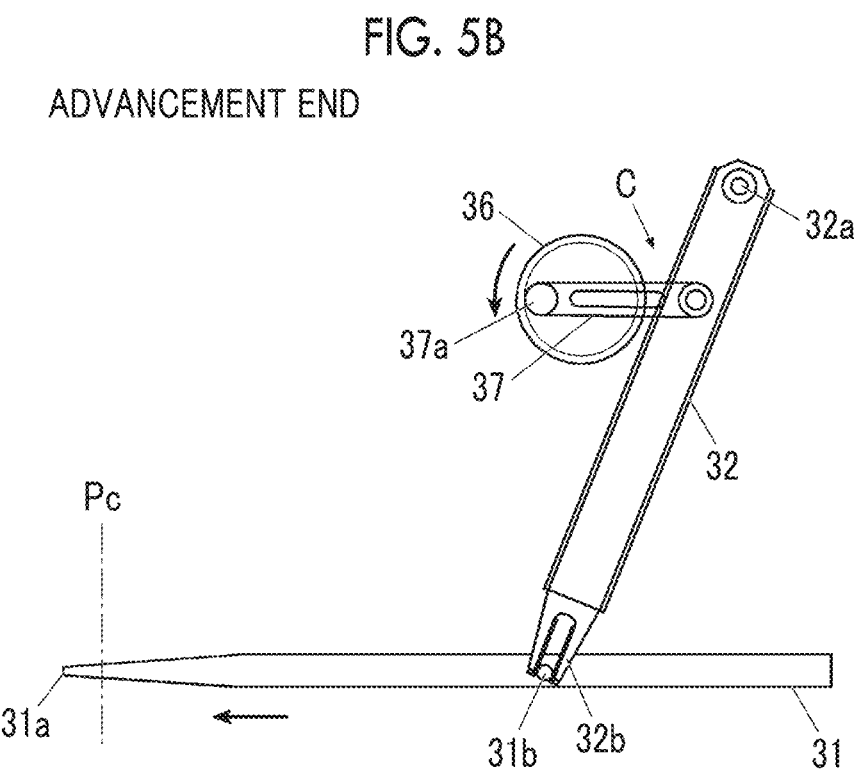

Next, the control unit 53 starts driving the servomotor 34 to rotate the gear 36 counterclockwise (hereinafter, simply referred to as "counterclockwise") in FIG. 5A to and 6B. Then, when the connecting rod connecting portion 37a is positioned almost at the top dead center in the crank mechanism C, the moving nozzle 31 is in a state where the tip 31a is positioned at the advancement end in an advancing and retreating stroke (FIG. 5B). The advancement end is a position advanced by a predetermined distance L from the press center Pc.

In this case, the slide 11 is still positioned at the top dead center.

After that, the control unit 53 starts moving the slide 11 toward a bottom dead center while further rotating the gear 36 counterclockwise. Thereafter, the control unit 53 keeps the speed (number of rotations) of the servo motor 34 constant as the slide approaches the bottom dead center of the crank mechanism C, and then decelerates the servo motor.

Figure 6A:
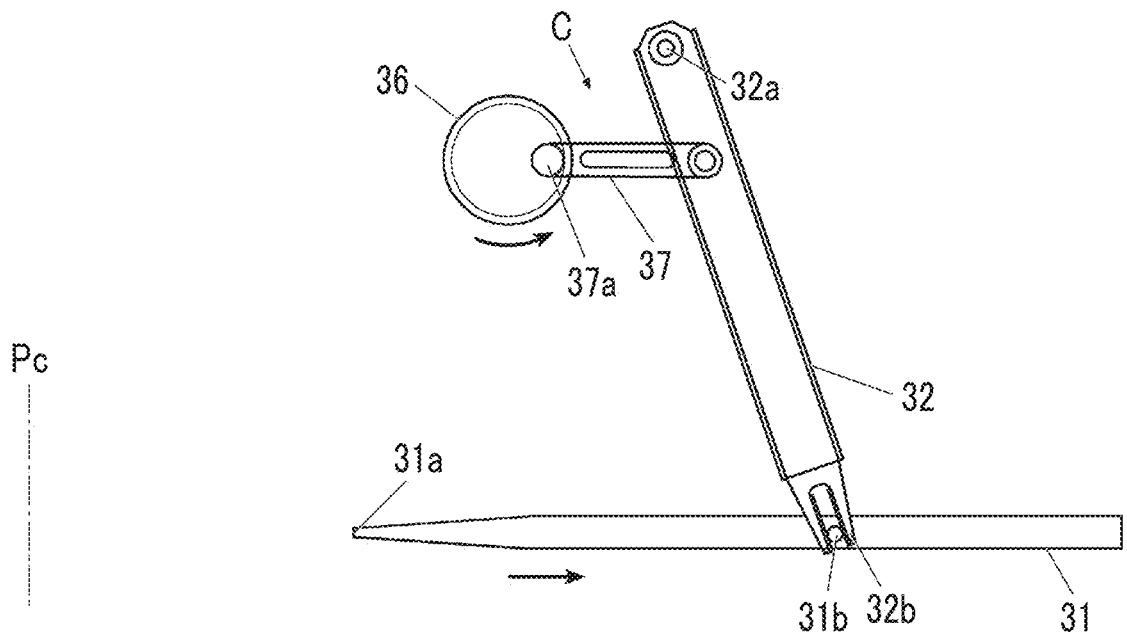
FIGS. 6A and 6B are views for describing movements of the moving nozzle and the crank mechanism.

Then, when the connecting rod connecting portion 37a is positioned at the bottom dead center (a position in a 3'o clock direction in FIGS. 5A to 6B) in the crank mechanism C, the moving nozzle 31 is in a state where the tip 31a is positioned at the retreat end in an advancing and retreating stroke (FIG. 6A).

In this case, the slide 11 is also in a state of being positioned at the bottom dead center.

After that, the control unit 53 moves the moving nozzle 31 from the retreat end to the advancement end by driving the servo motor 34 to further rotate the gear 36 counterclockwise. Then, when the connecting rod connecting portion 37a is positioned almost at the top dead center in the crank mechanism C, the moving nozzle 31 is in a state where the tip 31a is positioned at the advancement end in an advancing and retreating stroke (FIG. 5B).

In this case, the slide 11 reaches the top dead center before the moving nozzle 31 is positioned at the advancement end, and the movement is stopped.

Figure 6B:
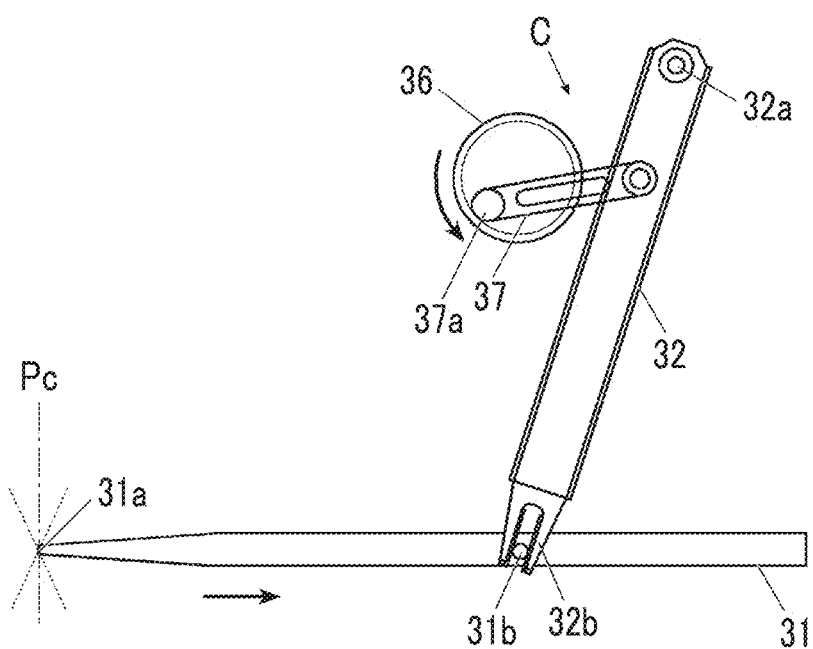
Figure 7:
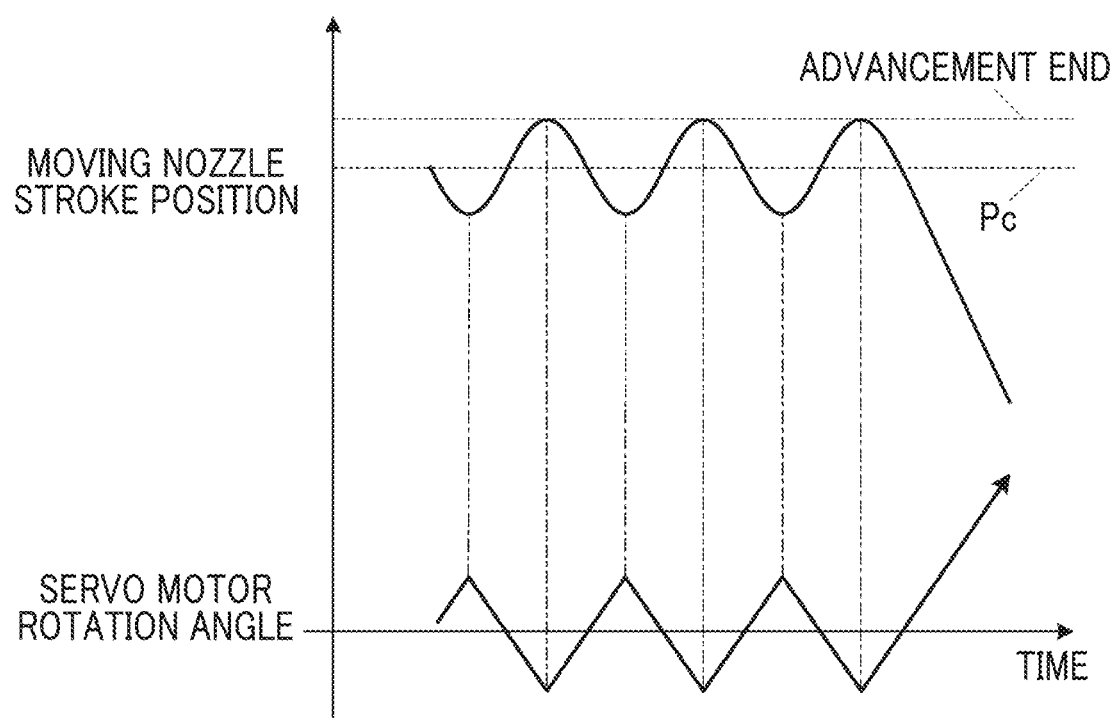
FIG. 7 is a graph for describing an oscillating operation of the moving nozzle when spraying a release agent.

Then, the control unit 53 further rotates the gear 36 counterclockwise, and stops the movement of the moving nozzle 31 in a state where the moving nozzle 31 has positioned the tip 31a at the press center Pc (FIG. 6B).

In this case, in the crank mechanism C, the connecting rod connecting portion 37a is in the vicinity of the top dead center, and is positioned in an 8 o'clock direction in the drawing in the embodiment.

The control unit 53 operates the jetting device 38 in this stopped state, and sprays a release agent in an atomizing state from the tip 31a of the moving nozzle 31 toward the dies (the upper die 12 and the lower die 13).

When a series of spraying operations start again after the spraying of the release agent has ended, the control unit 53 drives the servomotor 34 to move the connecting rod connecting portion 37a to the starting position described above (the position in the 10 o'clock direction in the figures). Then, the control unit 53 repeats the same operation described above.

When spraying a release agent, as shown in FIG. 7, the release agent may be jetted from the tip 31a while the moving nozzle 31 oscillates back and forth about a startup stopping position (a position where the tip 31a is at the press center Pc). In this case, the control unit 53 may operate the jetting device 38 while repeatedly reversing a rotation direction of the servo motor 34 at a predetermined cycle. The oscillation range of the moving nozzle 31 is not particularly limited.

Accordingly, spraying irregularity of the release agent onto the dies can be suppressed. In addition, since the crank mechanism C is operated in the vicinity of the top dead center, a load on the servo motor 34 can be suppressed to be low due to the toggle effect.

Technical Effects of Embodiment

As described above, in the embodiment, the servomotor 34 and the moving nozzle 31 that jets a release agent from the tip 31a are connected to each other via the link mechanism (crank mechanism C) that advances and retreats the moving nozzle 31 by a rotation output of the servo motor 34 in one direction.

For this reason, unlike a mechanical interlocking type of the related art, the moving nozzle 31 and the slide 11 (and the drive unit 20 thereof) of the apparatus main body 100 are mechanically disconnected (not connected). Accordingly, the impact of a pressing operation by the apparatus main body 100 can be prevented from being transmitted to the drive mechanism of the moving nozzle 31.

In addition, since the moving nozzle 31 can be moved so as to be advanced and retreated by a rotation output of the servo motor 34 in one direction, when switching from retreat to advancement of the moving nozzle 31, it is not necessary to accelerate or decelerate the rotation of the servo motor 34 to reverse the direction, unlike the servomotor drive type of the related art in which the moving nozzle is moved by a ball screw. Accordingly, the moving nozzle 31 can be operated at a high speed.

Therefore, the moving nozzle 31 can be operated at a high speed while suppressing a defect caused by the impact of the pressing operation. Further, since the stroke amount of the moving nozzle 31 can be increased, the moving nozzle can be suitably applied to a large-scale press apparatus.

In addition, in the embodiment, the startup stopping position of the moving nozzle 31 corresponds to the vicinity of the top dead center of the crank mechanism. C, and the retreat end of the advancing and retreating stroke of the moving nozzle 31 corresponds to the bottom dead center of the crank mechanism C.

For this reason, due to the toggle effect of the crank mechanism C, a load on the servo motor 34 and the transmission of impact on an input side (servo motor 34 side) particularly at these positions can be suppressed.

In addition, in the embodiment, the startup stopping position of the moving nozzle 31 that sprays a release agent is a position retreated by the predetermined distance L from the advancement end of the advancing and retreating stroke of the moving nozzle 31 corresponding to the top dead center of the crank mechanism C.

For this reason, a starting time of the servomotor 34 can be secured at the time of start-up, and a time (deceleration time) for the moving nozzle 31 to overrun from the advancement end can be secured at the time of stopping. Accordingly, acceleration at the time of starting and stopping can be suppressed, and a mechanical load on the crank mechanism C can be suppressed.

In addition, in the embodiment, a release agent is jetted from the tip 31a of the moving nozzle 31 while oscillating the moving nozzle 31 back and forth about the startup stopping position.

Accordingly, spraying irregularity of the release agent onto the dies can be suppressed. In addition, since the crank mechanism C is operated in the vicinity of the top dead center, a load on the servo motor 34 can be suppressed to be low due to the toggle effect.

Others

Although the embodiment of the present invention has been described hereinbefore, the present invention is not limited to the embodiment.

For example, although the gear 36 of the crank mechanism C rotates counterclockwise in the drawings in the embodiment, the gear may rotate clockwise. In this case, the starting position of the connecting rod connecting portion 37a may be, for example, a position in the 8 o'clock direction and the stopping position thereof may be a position in the 10 o'clock direction.

In addition, in a case where the apparatus is stopped urgently while the slide 11 descends, the moving nozzle 31 may be stopped at the retreat end. In addition, in a case where the moving nozzle is not stopped at a press top dead center (cannot be stopped at the top dead center), the servo motor 34 may be accelerated to continue the rotation, thereby avoiding interference between the moving nozzle 31 and the slide 11.

In addition, in a case where an operation of the release agent spraying device 30 is synchronized with slide motion, it is preferable that a long stop time for the moving nozzle 31 (time from the stop to the next start), that is, a release agent spraying time can be secured.

In addition, even in a case where a press master method (a method of continuously forging without stopping the slide 11 at the top dead center) is used, a release agent can be continuously sprayed, without starting and stopping the servo motor 34, by continuously rotating the servo motor 34 in one direction while synchronizing with the slide 11.

In addition, in the embodiment, the press apparatus 1 includes the apparatus main body 100, the release agent spraying device 30, and the control device 50. However, the control device 50 may be a part of the apparatus main body 100 or the release agent spraying device 30, or a controller may be provided in each of the apparatus main body 100 and the release agent spraying device 30.

In addition, details described in the embodiment can be changed as appropriate without departing from the gist of the invention.

It should be understood that the invention is not limited to the above-described embodiment, but may be modified into various forms on the basis of the spirit of the invention. Additionally, the modifications are included in the scope of the invention.

What is claimed is:

1. A release agent spraying device that sprays a release agent to a die of a forming apparatus main body, the release agent spraying device comprising:
   a motor;
   a moving nozzle that advances and retreats in a direction intersecting a moving direction of the die and jets the release agent from a tip; and
   a crank mechanism that connects the motor to the moving nozzle and advances and retreats the moving nozzle by a rotation output of the motor in one direction,
   wherein the crank mechanism includes
      a gear that is connected to the motor,
      a lever that advances and retreats the moving nozzle with oscillation, and
      a connecting rod that comprises one end portion connected to an eccentric portion of the gear and the other end portion connected to the lever, and oscillates the lever with rotation of the gear,
   wherein when the connecting rod is positioned at a vicinity of a top dead center, the moving nozzle is positioned at a startup stopping position and when the connecting rod is positioned at the top dead center, the moving nozzle is positioned at an advancement end in an advancing and retreating stroke, and
   wherein the startup stopping position is a position where the release agent is sprayed, and is a position retreated by a predetermined distance from the advancement end in the advancing and retreating stroke.

2. The release agent spraying device according to claim 1, wherein
   when the connecting rod is positioned at a bottom dead center, the moving nozzle is positioned at a retreat end in the advancing and retreating stroke.

3. The release agent spraying device according to claim 1, further comprising:
   a controller that controls an operation of the motor and jetting of the release agent from the moving nozzle,
   wherein the controller causes the release agent to be jetted from the tip of the moving nozzle while oscillating the moving nozzle back and forth about the startup stopping position.

4. A forming apparatus comprising:
   a forming apparatus main body including a die and a slide that is fixed to the die and advances and retreats in a moving direction of the die;
   a release agent spraying device including a motor, a moving nozzle that advances and retreats in a direction intersecting the moving direction of the die and jets a release agent from a tip to the die, and a crank mechanism that connects the motor to the moving nozzle and advances and retreats the moving nozzle by a rotation output of the motor in one direction; and
   a controller that controls an operation of the motor and jetting of the release agent from the moving nozzle,
   wherein the controller controls operations of the motor and the moving nozzle in synchronization with an operation of the slide,
   wherein the crank mechanism includes
      a gear that is connected to the motor,
      a lever that advances and retreats the moving nozzle with oscillation, and
      a connecting rod that comprises one end portion connected to an eccentric portion of the gear and the other end portion connected to the lever, and oscillates the lever with rotation of the gear,
   wherein when the connecting rod is positioned at a vicinity of a top dead center, the moving nozzle is positioned at a startup stopping position and when the connecting rod is positioned at the top dead center, the moving nozzle is positioned at an advancement end in an advancing and retreating stroke, and
   wherein the startup stopping position is a position where the release agent is sprayed, and is a position retreated by a predetermined distance from the advancement end in the advancing and retreating stroke.

\* \* \* \* \*